No. 716,867. Patented Dec. 30, 1902.
F. CONRAD.
MEANS FOR MEASURING THE ENERGY OF THREE-PHASE ALTERNATING CURRENT CIRCUITS.
(Application filed Feb. 14, 1901.)
(No Model.) 2 Sheets—Sheet 1.
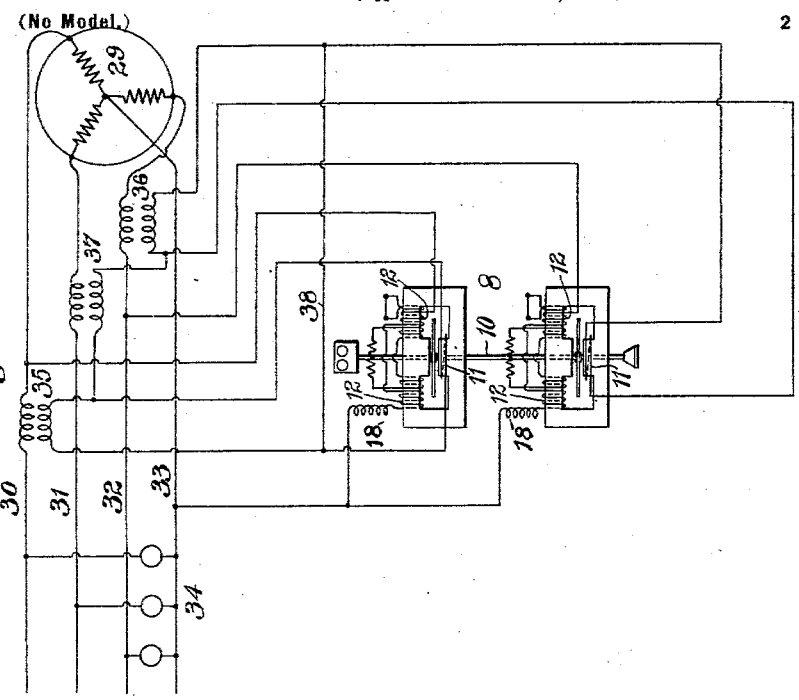
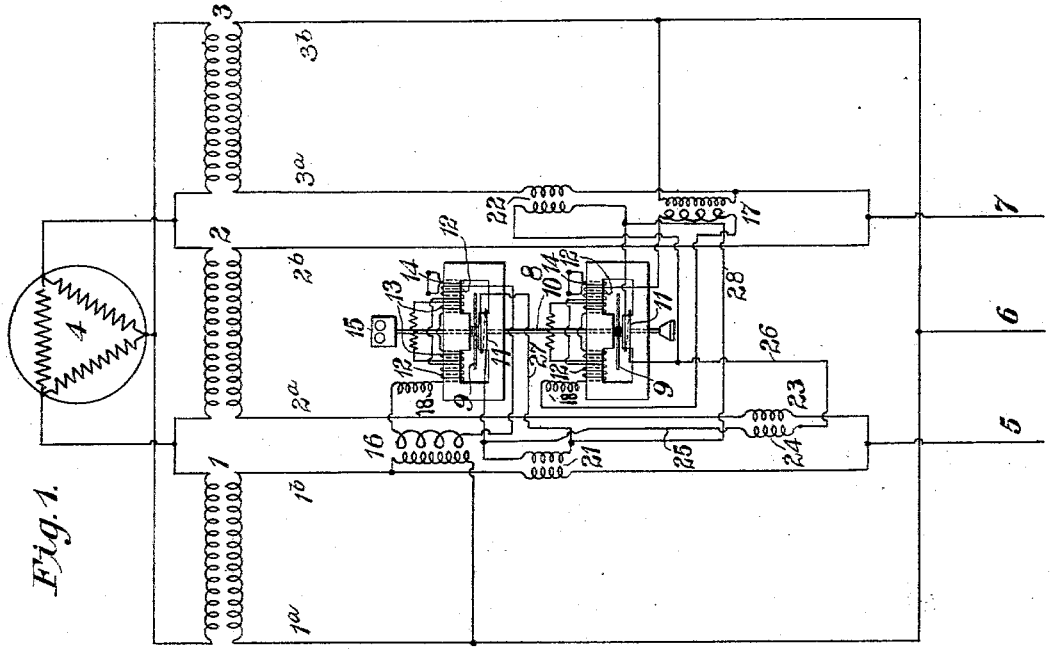
WITNESSES:
C. L. Belcher
Birney Hines
INVENTOR
Frank Conrad
BY
/ATTORNEY.

No. 716,867. Patented Dec. 30, 1902.
F. CONRAD.
MEANS FOR MEASURING THE ENERGY OF THREE-PHASE ALTERNATING CURRENT CIRCUITS.
(Application filed Feb. 14, 1901.)
(No Model.) 2 Sheets—Sheet 2.
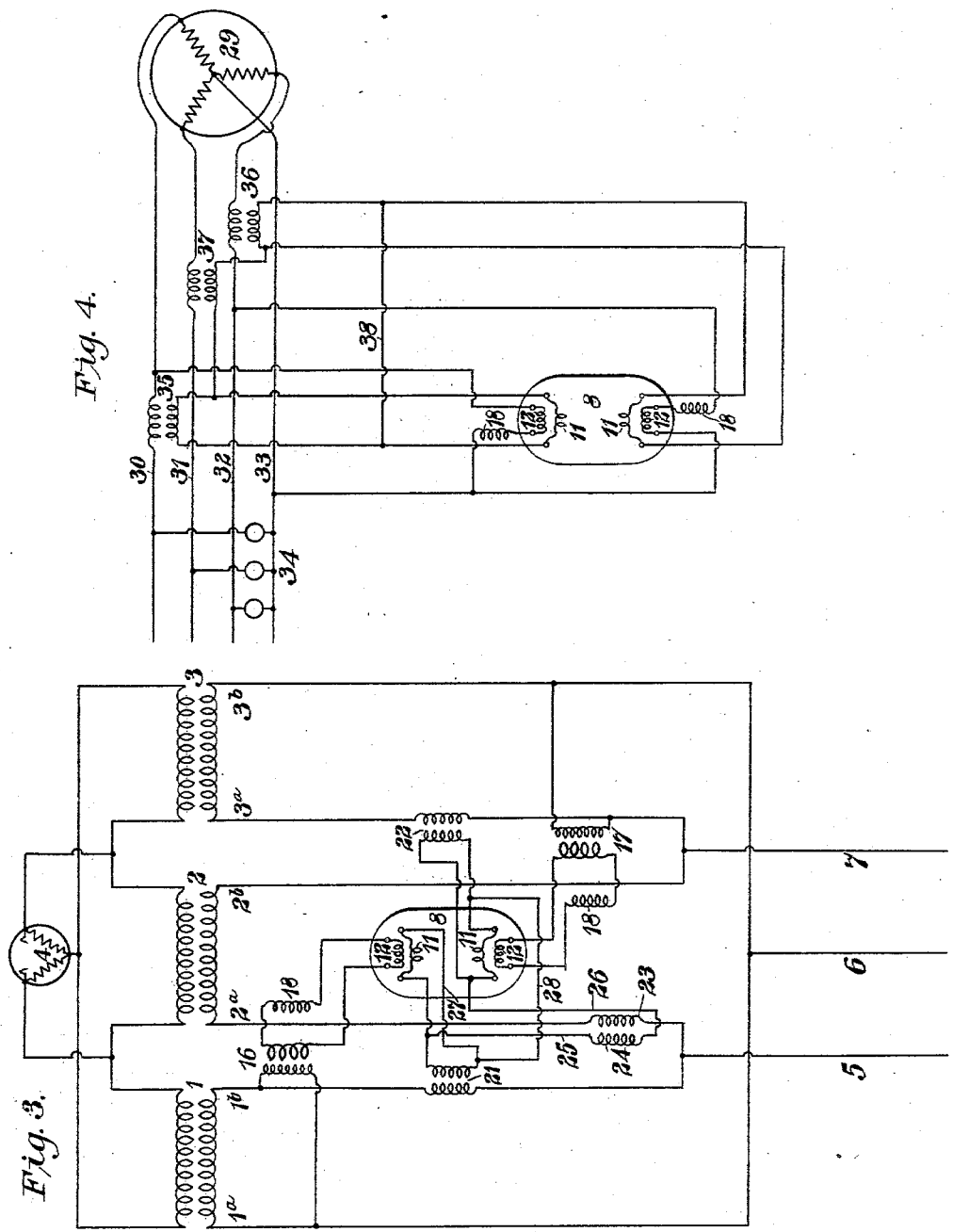
WITNESSES:
C. L. Belcher
Birney Hines
INVENTOR
Frank Conrad
BY
Wesley G. Carr
ATTORNEY

UNITED STATES PATENT OFFICE.

FRANK CONRAD, OF WILKINSBURG, PENNSYLVANIA, ASSIGNOR TO WESTINGHOUSE ELECTRIC & MANUFACTURING COMPANY, A CORPORATION OF PENNSYLVANIA.

MEANS FOR MEASURING THE ENERGY OF THREE-PHASE ALTERNATING-CURRENT CIRCUITS.

SPECIFICATION forming part of Letters Patent No. 716,867, dated December 30, 1902.

Application filed February 14, 1901. Serial No. 47,349. (No model.)

*To all whom it may concern:*

Be it known that I, FRANK CONRAD, a citizen of the United States, residing at Wilkinsburg, in the county of Allegheny and State of Pennsylvania, have invented a new and useful Improvement in Means for Measuring the Energy of Three-Phase Alternating-Current Circuits, of which the following is a specification.

My invention relates to alternating-current systems of electrical distribution, and particularly to means for measuring the energy of such systems.

The object of my invention is to provide means whereby the energy of three-phase circuits may be measured by a two-phase wattmeter or by two single-phase wattmeters.

In power installations it is often found necessary to measure the output of three transformers which are connected in delta to a three-phase circuit or the energy of three circuits which are otherwise interconnected in such manner that the voltage of any one of them is equal to the resultant voltage of the other two. It is obvious that such energy may be measured by means of independent single-phase wattmeters respectively connected to the several circuits, the readings of the three meters being added together; but inasmuch as it is always desirable to simplify apparatus so far as may be practicable without impairing the efficiency it will obviously be advantageous to measure the energy of three interconnected circuits by means of a single instrument. I have therefore devised the circuit connections shown in the accompanying drawings, in which—

Figure 1 is a diagram of a portion of a three-phase system embodying three transformers the primaries of which are connected to the source of current in delta and the secondaries of which are connected in the same manner to a three-phase distributing-circuit and in which a two-phase wattmeter is so connected to the transformer secondaries as to accurately measure the output. Fig. 2 is a diagram of a three-phase four-wire circuit and a two-phase wattmeter so connected as to measure the entire energy of such circuit. Fig. 3 is a simplified diagram of circuits corresponding to what is shown in Fig. 1, and Fig. 4 is a similar view corresponding to what is shown in Fig. 2.

My invention comprises circuits and circuit connections whereby the above-mentioned results are secured, and hence it is immaterial to the invention what type or kind of wattmeter be employed and whether it be provided with means for indicating, registering, or recording the energy measured by it.

Referring particularly to Fig. 1 of the drawings, 1, 2, and 3 are transformers the primary windings of which are connected in delta to a three-phase generator 4. The secondary windings of the transformers 1, 2, and 3 are also connected in delta to a distributing or transmission circuit 5, 6, and 7. In order to measure the output of the transformers 1, 2, and 3, I may employ a wattmeter of any suitable construction. As an example of a suitable instrument I have shown a wattmeter 8 like that illustrated in Fig. 5 of Patent No. 608,842, granted to H. P. Davis and myself August 8, 1898, in which the armatures 9 of two instruments are mounted upon a vertical shaft or spindle 10. In combination with each armature 9 are a series field-winding 11 and a shunt field-winding 12, a closed coil phase adjusting-winding 13, and a friction compensating coil 14, all as set forth in the patent above referred to.

While the mechanism just described for convenience and compactness of arrangement may be embodied in a single instrument, it would be feasible to employ two independent instruments, since the only interdependence which exists in the structure, as shown, resides in the mounting of the armatures upon a single shaft or spindle and the employment of a single registering device 15. For the reason just stated the measuring apparatus shown may for convenience be regarded as comprising either one or two instruments, and I therefore desire it to be understood that references hereinafter made in the specification or the claims either to members of one instrument or to two instruments are not to be construed as excluding either of the arrangements mentioned.

In utilizing the instrument 8 in accordance with my present invention I connect the shunt-windings of the upper and lower members of the wattmeter, respectively, to the secondary windings of transformers 16 and 17, the primary windings of which are respectively connected across the circuits $1^a$ $1^b$ and $3^a$ $3^b$. Inductive resistance-coils 18 may be included in circuit between each of the shunt-windings 12 and the secondary of the corresponding transformer 16 or 17 for the purpose of retarding the phase of the currents in the shunt-windings in the usual manner. It will be understood that the shunt-coils 12 of the wattmeter may be connected directly to the conductors $1^a$, $1^b$, $3^a$, and $3^b$ in cases where the voltages of the circuits are suitable for the said coils. The series coils of the upper and lower members of the instrument 8 are respectively supplied with currents proportional to those of the circuits $1^a$ $1^b$ and $3^a$ $3^b$ by means of series transformers 21 and 22, the primaries of such transformers being respectively included in conductors $1^b$ and $3^a$. To the extent above described the connections are those used in connection with a polyphase wattmeter employed for measuring the output of a two-phase circuit, the upper member of the instrument measuring the output of the transformer 1 and the lower member measuring the output of the transformer 3.

In order to measure the output of transformer 2, I provide a series transformer 23, the primary of which is included in the conductor $2^a$, leading from the secondary of the transformer 2, and make connections as follows: The terminals of the secondary winding 24 of the transformer 23 are respectively connected by means of conductors 25 and 26 to one terminal of the series coil 11 of the upper member and to the corresponding terminal of the series coil 11 of the lower member of the instrument 8. The other terminals of the coils 11 are connected together by means of conductors 27 and 28. It will be seen, therefore, that the current from the secondary 24 of series transformer 23 passes through the two windings 11 in series, and consequently that the current in the series winding of the upper member of the instrument 8 will be the resultant of the currents delivered by transformers 1 and 2, while the current in coil 11 of the lower member of the instrument will be the resultant of the currents delivered by the transformers 2 and 3. As has already been pointed out, the electromotive force impressed upon the shunt-winding of the upper member will be that of the transformer 1, while the electromotive force impressed upon the shunt-winding of the lower member will be that of the transformer 3. Since the voltage of any one of three transformers connected in delta in a three-phase circuit is equal to the resultant of the voltages of the other two transformers, it follows that the voltage of transformer 2 is equal to the resultant voltage of transformers 1 and 3. It follows, therefore, that if two wattmeter readings were taken in which one should be the product of the current from transformer 2 by the voltage from transformer 1 and the other should be the product of the current from transformer 2 by the voltage from transformer 3 the sum of these readings would be equal to the energy supplied by transformer 2. Since the current from transformer 2 is thus accurately measured twice—that is, once with the voltage from the transformer 1 in the upper member and once with the voltage from transformer 3 in the lower member of the instrument 8—it follows that the energy delivered by the transformer 2, as well as that delivered by transformers 1 and 3, will be properly measured in the instrument 8.

It will of course be understood that the primary winding of each of the series transformers may be included in either leg of the corresponding circuit.

Referring now particularly to Fig. 2 of the drawings, 29 is a three-phase generator that supplies energy to a four-wire three-phase circuit 30, 31, 32, and 33 either directly or through suitable transformers, as is usual in the art. As indicated in the drawings, the conductors 30, 31, 32, and 33 supply electric lights 34; but I do not intend to thereby exclude other forms of translating devices. The wattmeter 8 employed for measuring the energy of circuits 30, 31, 32, and 33 may be of the same construction as that already described and is, in fact, shown as of the same construction as that illustrated in Fig. 1. The description heretofore given of the instrument may be therefore read in connection with this figure, the reference-numerals being the same in both figures. As in the case of energy supplied by three transformers connected in delta to three-phase circuits it has heretofore been the practice to use three single-phase meters for measuring the output of four-wire three-phase circuits, such as are illustrated in Fig. 2. In order to utilize a single two-phase instrument or two independent single-phase instruments, and thereby simplify the apparatus and reduce the cost, I make connections as follows: The shunt-winding 12 of the upper member of the instrument is connected across circuit 30 33 and the shunt-winding 12 of the lower member of the instrument is connected across circuit 32 33. If the voltages of the circuits 30 33 and 32 33 are too high for the shunt-coils of the instrument, transformers may be employed, as indicated in Fig. 1. The series winding 11 of the upper member of the instrument has its terminals respectively connected to the terminals of the secondary winding of a series transformer 35, the primary of which is included in conductor 30. In a similar manner the terminals of the series winding of the lower member of the instrument are connected to the terminals of the secondary winding of transformer 36, the primary of which is included in conductor 32, these transformers and their connections corresponding with the transformers 21 and 22 and the connections shown in Fig. 1. The connections thus far described are such as to measure the energy of circuits 30 33 and 32 33. In order to also measure the energy of circuit 31 33, I include the primary of a series transformer 37 in conductor 31 and connect one terminal of the secondary winding to one terminal of the secondary transformer 36 and the other terminal of said winding to one terminal of the secondary winding of transformer 35. I also connect the opposite terminals of the secondaries of transformers 35 and 36 together by means of a conductor 38. With this arrangement of circuits it will be seen that the current from transformer 37, starting with the terminal connected to one terminal of the secondary transformer 36, will pass through the series winding of the lower member of the instrument 8 and by way of the conductor 38 through the series winding of the upper member of the instrument 8 and by the connections shown back to the other terminal of the secondary of transformer 37. As in the system illustrated in Fig. 1, the voltage of each of the circuits here shown is equal to the resultant of the voltages of the other two circuits, and it will therefore appear from the description given in connection with the apparatus and circuits illustrated in Fig. 1 that the instrument 8 will accurately measure the energy of all three of the circuits 30 33, 31 33, and 32 33. It will be understood in connection with this form of the invention that each of the series transformers may be connected with either leg of the corresponding circuit.

Such other modifications as may be made without materially affecting the mode of operation and result I regard as within my invention and desire to cover by my claims. The connections whereby a two-phase wattmeter or two single-phase wattmeters may be employed for measuring the energy of three circuits may be utilized in connection with any system where the voltage of any one of the three connected circuits is equal to the resultant of the other two, and my invention may be also utilized in connection with the actuating or magnetizing coils of apparatus other than wattmeters when it is desired to energize two of such coils from a three-phase circuit.

I claim as my invention—

1. The combination with three interconnected electric circuits, the voltage of any one of which is equal to the resultant voltage of the other two, of two field-windings connected respectively across two of said circuits and two field-windings respectively traversed by current proportional to that of said two circuits and jointly traversed by current proportional to that of the third circuit.

2. The combination with three interconnected, alternating-current electric circuits, of a measuring instrument comprising two members each of which is provided with a voltage-winding and a current-winding, the voltage-windings being respectively connected to receive voltages proportional to two of said interconnected circuits and the current-windings being connected to respectively receive currents proportional to those of the said two circuits and being also so connected as to jointly receive current proportional to that of the third circuit.

3. In a system of electrical distribution comprising three interconnected, alternating-current circuits, an energy-measuring instrument comprising two members each of which has a current-winding and a voltage-winding, said current-windings being respectively traversed by currents that are proportional to those of two of the circuits and being jointly traversed by current that is proportional to that of the other circuit and said voltage-windings being respectively subjected to voltages that are proportional to those of said two circuits.

4. In a system of electrical distribution comprising three interconnected, alternating-current circuits, an energy-measuring instrument comprising two members each of which has a stationary current-winding and a stationary voltage-winding, said current-windings being respectively connected in circuit to receive currents that are proportional to those of two of the circuits and being connected to jointly receive current that is proportional to the third circuit and said voltage-windings being connected in circuit to receive currents the voltages of which are respectively proportional to those of the first-named two circuits.

5. The combination with three interconnected electric circuits, the voltage of any one of which is equal to the resultant voltage of the other two, of two magnetizing or actuating windings severally traversed by currents proportional to those of said respective two circuits and jointly traversed by current proportional to that of the third circuit.

6. The combination with three interconnected electric circuits, the voltage of any one of which is equal to the resultant voltage of the other two, of three transformers the primaries of which are respectively included in said circuits, and two magnetizing or actuating windings which are severally connected to two of the secondaries of said transformers and are jointly connected to the secondary of the third transformer.

7. The combination with a three-phase circuit having the primary windings of three transformers severally included in three conductors of said circuit, of two magnetizing or actuating windings severally connected to the terminals of the secondaries of two of said transformers and jointly connected to the terminals of the secondary of the third transformer.

In testimony whereof I have hereunto subscribed my name this 8th day of February, 1901.

FRANK CONRAD.

Witnesses:
   JAMES B. YOUNG,
   WESLEY G. CARR.